United States Patent Office 3,458,581
Patented July 29, 1969

3,458,581
**TRIS(DISUBSTITUTED PHOSPHINYLETHYL)-
PHOSPHINE OXIDES**
Chisung Wu, North Brunswick, N.J., assignor to Union
Carbide Corporation, a corporation of New York
No Drawing. Original application Dec. 2, 1965, Ser. No.
511,258, now Patent No. 3,420,917. Divided and this
application July 2, 1968, Ser. No. 741,846
Int. Cl. C07f 9/28
U.S. Cl. 260—606.5
6 Claims

ABSTRACT OF THE DISCLOSURE

A new class of phosphine oxides comprising the tris(disubstituted phosphinylethyl)phosphine oxides represented by the formula:

$$[R_2\overset{Z}{\overset{\uparrow}{P}}CH_2CH_2]_3\overset{O}{\overset{\uparrow}{P}}$$

where Z represents oxygen or sulfur, and R represents a monovalent hydrocarbon group free of unsaturation (other than aromatic unsaturation) that is alpha, beta to the $$\overset{Z}{\overset{\uparrow}{P}}$$

group. When R is alkyl it may have up to 18 carbon atoms; when R is aryl it may have up to 10 carbon atoms. These compounds may be made by reacting a vinyl phosphine oxide or a vinyl phosphonate or its sulphur analogue with elemental phosphorus and aqueous alkali. The phosphine oxides of this invention are useful as flame retardants, plasticizers, surfactants and metal extractants.

---

This application is a division of application Ser. No. 511,258, filed Dec. 2, 1965, now U.S. Patent No. 3,420,917.

The invention relates to a new class of phosphine oxides. More particularly, the invention relates to a new class of compositions comprising the tris(disubstituted phosphinyl-ethyl)phosphine oxides.

The phosphine oxides of the invention can be represented by Formula I:

$$[R_2\overset{Z}{\overset{\uparrow}{P}}CH_2CH_2]_3\overset{O}{\overset{\uparrow}{P}} \qquad \text{I}$$

wherein Z represents oxygen or sulfur, and wherein R represents (a) a monovalent hydrocarbon group free of unsaturation (other than aromatic unsaturation) that is alpha, beta- to the $$\overset{Z}{\overset{\uparrow}{P}}$$

group. The said hydrocarbon groups can have substituent groups that are inert to aqueous alkali.

The compositions of the invention can be produced by reacting a vinyl phosphine oxide or a vinylphosphonate (or sulfur analogue thereof) with elemental phosphorus and aqueous alkali. The following reaction, in which R and Z have the significance stated above is illustrative:

$$9R_2\overset{Z}{\overset{\uparrow}{P}}CH=CH_2 + P_4 + 2KOH + 4H_2O \longrightarrow$$

$$3(R_2\overset{Z}{\overset{\uparrow}{P}}CH_2CH_2)_3\overset{O}{\overset{\uparrow}{P}} + K_2HPO_3$$

The compositions of the invention are produced by reacting the $$R_2\overset{Z}{\overset{\uparrow}{P}}CH=CH_2$$

reactant with elemental phosphorus in the presence of aqueous alkali. This reaction can be carried out by slowly adding the aqueous alkali to a stirred mixture of the elemental phosphorus and the said $$R_2\overset{Z}{\overset{\uparrow}{P}}CH=CH_2$$

reactant. The phosphorus can be molten or it can be finely divided if the reaction temperature is below the melting point of phosphorus (i.e., about 46° C.) The reaction temperature is not narrowly critical and it can vary widely, for instance, from about 0° C. to about 175° C., and preferably from about 15° C. to about 75° C. The reaction is mildly exothermic, and conventional heat transfer means can be used to maintain the desired reaction temperature. The reaction is continued for a period of time sufficient to produce the desired product, usually from about 10 minutes to about 10 hours, and preferably from about 30 minutes to about 5 hours.

Atmospheric pressure is normally employed for the reaction, although super-atmospheric or sub-atmospheric pressure can be used if desired. A liquid reaction medium can be employed, if desired. Such liquids as ethanol, acetonitrile, butanol, dioxane, tetrahydrofuran, mono- and diethyl ether of ethylene glycol, N,N-dimethylformamide, dimethyl sulfoxide, pyridine, and the like, can be employed as the reaction medium.

The aqueous alkali can be water solutions of sodium hydroxide, potassium hydroxide, lithium hydroxide, calcium hydroxide, or the like. Potassium hydroxide is preferred.

The proportion of the reactants can be stoichiometric, with the stoichiometry being based upon the illustrative equation shown above. Any of the reactants can be employed in excess, if desired.

The product can be recovered by conventional procedures, for instance, by filtration, distillation of the filtrate, and then recrystallization of the distillation residue from a hydrocarbon solvent.

Among the useful compositions that are provided by the invention are the tris[2-(dialkylphosphinyl)ethyl] phosphine oxides. These compounds are formed when the $$R_2\overset{Z}{\overset{\uparrow}{P}}CH=CH_2$$

reactant is a dialkylvinylphosphine oxide. Dialkylvinyl-phosphine oxides are known materials that can be produced by the following reaction sequence (wherein $R^1$ represents alkyl):

$$(R^1)_2PCl + CH_2=CHMgCl \longrightarrow$$

$$(R^1)_2PCH=CH_2 \xrightarrow{[O_2]} (R^1)_2\overset{O}{\overset{\uparrow}{P}}CH=CH_2$$

(The well known text by G. M. Kosolapoff, "Organophosphorus Compounds," published by John Wiley & Sons, Inc., New York, describes the foregoing reactions and others that are discussed below.) Among the useful tris[2-(dialkylphosphinyl)ethyl]phosphine oxides that are within the scope of the invention are the following illustrative compounds:

Tris[2-(dimethylphosphinyl)ethyl]phosphine oxide
Tris[2-(diethylphosphinyl)ethyl]phosphine oxide
Tris[2-(diisopropylphosphinyl)ethyl]phosphine oxide
Tris[2-(dibutylphosphinyl)ethyl]phosphine oxide
Tris[2-(dipentylphosphinyl)ethyl]phosphine oxide
Tris[2-(dihexylphosphinyl)ethyl]phosphine oxide
Tris[2-(dicyclohexylphosphinyl)ethyl]phosphine oxide
Tris[2-(diheptylphosphinyl)ethyl]phosphine oxide
Tris[2-(dioctylphosphinyl)ethyl]phosphine oxide
Tris[2-(dinonylphosphinyl)ethyl]phosphine oxide
Tris[2-(didecylphosphinyl)ethyl]phosphine oxide
Tris[2-(dilaurylphosphinyl)ethyl]phosphine oxide
Tris[2-(ditetradecylphosphinyl)ethyl]phosphine oxide
Tris[2-(dihexadecylphosphinyl)ethyl]phosphine oxide
Tris[2-(distearylphosphinyl)ethyl]phosphine oxide
Tris[2-(methylethylphosphinyl)ethyl]phosphine oxide.

Usually, the alkyl groups of the tris [2-(dialkylphosphinyl)-ethyl]phosphine oxide will have up to 18 carbon atoms, preferably up to 10 carbon atoms, and more preferably up to 4 carbon atoms.

A second useful class of compounds that are within the scope of the invention are the tris [12-(dialkylthiophosphinyl)ethyl] phosphine oxides. The vinyldialkylphosphine sulfides used to produce said compounds are produced by reacting sulfur with a vinyldialkylphosphine. Illustrative of these sulfur-containing compounds are tris[2-(dimethylthiophosphinyl)ethyl]phosphine oxide,
tris[2-(diethylthiophosphinyl)ethyl]phosphine oxide,
tris[2-(diisopropylthiophosphinyl)ethyl]phosphine oxide,
tris[2-(dibutylthiophosphinyl)ethyl]phosphine oxide, and the like.

A third useful class of novel compounds are the tris [2-(diarylphosphine)ethyl]phosphine oxides which can be prepared from vinyldiarylphosphine oxides. Vinyldiarylphosphine oxides can be produced from vinyl magnesium chloride and diarylchlorophosphines, followed by oxidation to form the oxide (or reaction with sulfur to form the sulfur analogue). Specific illustrative members of said third class of compounds include tris[2-(diphenylphosphinyl)ethyl]phosphine oxide, tris[2-ditolylphosphinyl) ethyl]phosphine oxide, tris[2-(dixylylphosphinyl)-ethyl] phosphine oxide, and the like, wherein the aryl groups have up to 10 carbon atoms. The thio analogues of said third class of compounds include tris[2-(diphenylthiophosphinyl)ethyl]phosphine oxide and the like.

The novel phosphine oxides of the invention are widely useful compositions. For instance, they can be employed as additives to improve the flame resistance of many polymers such as vinyl chloride polymers, epoxy resins, phenolic resins, and the like. The tris[2-(di[higher alkyl] phosphinyl) ethyl]phosphine oxides are useful as plasticizers for vinyl chloride polymers and other polymers. Many of the long chain alkyl-containing phosphine oxides exhibit surface activity and are therefore useful as surfactants. The multiplicity of the polar phosphoryl group makes them strongly complexing ligands for metal ions, and thus useful in metal extraction, and the like.

The following examples illustrate the invention:

Example 1.—Tris(2-dibutyl phosphinylethyl) phosphine oxide

To a well stirred mixture of 1.4 grams of finely divided yellow phosphorus, 18.8 grams of vinyldibutylphosphine oxide, and 50 milliliters of ethanol under nitrogen was added 4.5 milliliters of 10 N aqueous potassium hydroxide dropwise over a period of 15 minutes. The mildly exothermic reaction was maintained at 25–30° C. for 4.5 hours. The reaction mixture was then filtered; the filtrate was evaporated and distilled under vacuum to remove the solvent and unreacted vinylphosphine oxide. The residue (12 g., 57% based on the vinylphosphine oxide) from the distillation was extracted with 500 milliliters of hot benzene. Upon cooling, 4 grams of a white solid separated from the benzene extract. Recrystallization of the solids from benzene yielded an analytical sample, M.P. 2000° C.

*Analysis.*—Calculated for $C_{30}H_{66}O_4P_4$: C, 58.61; H, 10.82; P, 20.15%. Found: 58.43; H, 10.52; P, 20.3%.

Example 2.—Tris(2-diphenylphosphinylethyl)posphine oxide

By the procedure of Example 1, 2 milliliters of 10 N aqueous potassium hydroxide was added during 20 minutes to a mixture of 0.7 gram of yellow phosphorus, 11.4 grams of vinyldiphenylphosphine oxide, and 30 milliliters of ethanol. The reaction was complete in 20 minutes. After filtration and evaporation of the reaction mixture there was obtained 13 grams (100%) of a white solid, M.P. 170–210° C. Recrystallization from a dilute methanol in xylene gave an analytical sample. M.P. 215–216° C.

*Analysis.*—Calculated for $C_{42}H_{42}O_4P_4$: C, 68.66; H, 5.76; P, 16.87. Found: C, 68.29; H, 5.79; P, 16.52.

Example 3.—Tris(2-diethylphosphinylethyl)phosphine oxide

Under the conditions of Example 1, 2.3 milliliters of 10 N aqueous potassium hydroxide was added in 15 minutes to a mixture of 1.4 grams of yellow phosphorus, 13.2 grams of vinyldiethylphosphine oxide, and 30 milliliters of ethanol. After reaction for 1 hour at 25–30° C., the reaction mixture was heated to 50° C. briefly to melt for an hour at room temperature. To ensure the complete consumption of phosphorous, an additional 1 milliliter of 10 N aqueous potassium hydroxide was added at this point, and the reaction mixture was further stirred for 3 hours at room temperature. The reaction mixture was evaporated, and the residue extracted with dry methanol. The methanol solution was evaporated and then distilled at 142° C. (1.2 mm. Hg) to remove volatile materials. There was obtained 13.5 grams (95%) of a white solid with a melting point of 194–203° C.

What is claimed is:
1. Composition of the formula

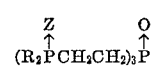

wherein Z represents oxygen or sulfur, and where each R individually represents a monvalent hydrocarbon group that is free of unsaturation other than aromatic unsaturation, and has no more than 18 carbon atoms when alkyl and no more than 10 carbon atoms when aryl.

2. Composition of claim 1 wherein said composition is a tris [2-(dialkylphosphinyl)ethyl]phosphine oxide.
3. Composition of claim 2 wherein said alkyl is ethyl.
4. Composition of claim 2 wherein said alkyl is butyl.
5. Composition of claim 1 wherein said composition is a tris[2-(diarylphosphinyl)ethyl]phosphine oxide.
6. Composition of claim 5 wherein said aryl is phenyl.

References Cited

UNITED STATES PATENTS 3,075,017　1/1963　Maier _____ 260—606.5
3,242,216　3/1966　Maier _____ 260—606.5

TOBIAS E. LEVOW, Primary Examiner
W. F. W. BELLAMY, Assistant Examiner

U.S. Cl. X.R.

252—8.1; 260—30.6, 429